United States Patent [19]

Wydler et al.

[11] 3,732,780

[45] May 15, 1973

[54] APPARATUS FOR PRODUCING VARIABLE RATIO GEARING

[75] Inventors: Robert Wydler; Erhard Ruesch, both of Zurich, Switzerland

[73] Assignee: Maag Gear Wheel & Machine Company Limited, Zurich, Switzerland

[22] Filed: Oct. 1, 1970

[21] Appl. No.: 77,242

[30] Foreign Application Priority Data

Oct. 9, 1969 Germany.....................P 19 50 959.2

[52] U.S. Cl......................................................90/8
[51] Int. Cl................................................B23f 5/14
[58] Field of Search........................90/8, 7, 10, 3, 2

[56] References Cited

UNITED STATES PATENTS

R14,908    7/1920    Maag...........................................90/8

| 2,507,725 | 5/1950 | Leuthold | 90/8 |
| 1,922,757 | 8/1933 | Candee | 90/7 |
| 1,922,756 | 8/1933 | Candee | 90/7 |

*Primary Examiner*—Gil Weidenfeld
*Attorney*—Howard J. Churchill & Abraham Engel

[57] ABSTRACT

A variable ratio gear component, such as a motor vehicle steering segment, is produced by arranging that relative motion between a workpiece forming the component and a tool includes a normal generating component and a graduated additional generating component, the latter being imparted to the workpiece tangentially to the generating path of the tool and workpiece. An adaptation of a gear cutting machine is described to provide for the inclusion of such an additional motion derived from the rotation of the workpiece relative to the table.

5 Claims, 4 Drawing Figures

APPARATUS FOR PRODUCING VARIABLE RATIO GEARING

The invention relates to generating systems for producing variable-ratio gearing, such as for use in the steering segments for motor vehicles, in which the normal generating motion between a workpiece and a tool is accompanied by a further relative motion in the same plane. The invention is concerned with a method of producing variable ratio gear components and with apparatus for the production of such components.

In a known generating method of the kind heretofore described (German Pat. specification No. 1,033,488) the relative motion, superimposed on the normal generating motion, comprises an additional rotation of the workpiece relative to a tool in the form of a hobbing mill.

To perform this method, a chuck for holding the workpiece is mounted on a guide bush which surrounds a guide boss, mounted on the rotating machine table and adapted to execute, relative to said boss, rotary motions around the machine table axis which coincides with the workpiece axis. In the axial direction the guide bush bears upon a cross member, held against rotation but being axially slidable and in turn bearing by means of rollers, on an axial cam, mounted on the machine table. When the machine table is rotated relative to the cross member, the axial cam generates an axially reciprocating motion of the cross member and therefore also of the guide bush with the chuck and workpiece. Rotation of the guide bush with the chuck and workpiece relative to the rotating machine table is generated by virtue of this reciprocating motion by having a radial pin mounted on the guide bush and adapted to engage in a control template slot disposed in the guide boss, said slot being disposed obliquely to the axial direction. The relative rotation due to the motion of the workpiece relative to the machine table resulting from the co-operation of the radial pin with the control template is superimposed on the normal rotating motion of the workpiece which is identical to the rotating motion of the machine table, so that the resultant gearing includes a middle tooth, the longitudinal extension of which is broader than the remaining teeth.

In such a gear tooth system, when provided for example for steering transmissions, in particular for motor vehicles, it is possible to eliminate slack due to wear in that the tooth segment, having a tooth broadened in the manner described hereinabove, is axially adjusted relative to the driving worm.

The invention departs from the above even as regards the problem on which it is based and relates to a method and apparatus for generating variable-ratio gear tooth systems. Such gear tooth systems are also used in steering transmissions; however, the variable ratio characteristics are not related to the demand for freedom from backlash of the transmission which at present is preferably satisfied by constructing the gear tooth systems in beveloid form which also permits slack-free adjustment by relative axial displacement of the gearing components. A gear wheel with a beveloid gear tooth system has a conical tooth tip surface in the same way as a bevel gear and has a cone shaped tooth root surface but in all other respects corresponds to a spurgear and co-operates with a second such spur gear, the axis of which extends in parallel to the axis of the first or is adapted to co-operate with a rack, in particular in steering transmissions.

The method and apparatus disclosed by the prior art and described hereinabove are neither intended nor suitable for generating variable-ratio gear tooth systems since these require an axial relative motion between workpiece and machine table of a magnitude which cannot be achieved under practical conditions. In particular, the known method does not disclose any practical facilities for producing variable-ratio beveloid gear tooth systems with the known apparatus.

It is the object of the invention to propose a generating method of the kind hereinbefore described, being also suitable for the production of beveloid gear tooth systems, and being suitable for performance with simple means, that is to say in particular on gear cutting machines of substantially conventional construction, to which only a relatively simple supplementary attachment is added.

According to the invention, a generating method of the kind heretofore described is further developed in that a translatory motion, derived from the rotating motion of the workpiece, is imparted to the workpiece as an additional relative motion tangentially to the rolling paths of the tool and of the workpiece.

The method according to the invention can be performed on a gear cutting machine having a work table, supported on a workpiece slide which is rotatable around the axis of the workpiece and in which there is also provided apparatus comprising a disc cam mounted on the work table and co-operating with a cam follower system for producing the workpiece slide displacement required for the additional relative motion, said cam follower system bearing upon a sub-slide, machine bed or the like.

The generating apparatus according to the invention is preferably provided on a gear cutting machine in which a spindle, supported in the sub-slide or the machine frame, and co-operating with a spindle nut supported on the workpiece slide, produces a translatory motion of the workpiece slide, said motion together with the rotation of the work table producing the normal generating motion relative to the tool constructed in rack form. To be employed on such a gear cutting machine the generating apparatus according to the invention can comprise means that hold the nut on the workpiece slide against rotation but allow it to slide in the axial direction under the control of the cam follower system.

In a preferred embodiment the cam follower system comprises a lever, supported on the workpiece slide, a sliding block adapted to engage in a transverse groove of the spindle nut being supported eccentrically to the bearing axis of the said lever.

To prevent the accuracy of the gear tooth system being impaired by slack between the individual parts of the apparatus, the workpiece slide in a preferred embodiment of the apparatus according to the invention is biassed with a substantially constant force acting opposite to the direction of movement produced by the disc cam. A piston-cylinder unit, operating under constant pressure and bearing on the sub-slide or machine bed, can be employed to provide the biassing force.

By way of example, the invention will now be more particularly described by reference to the accompanying drawings, in which.

Figure 1:
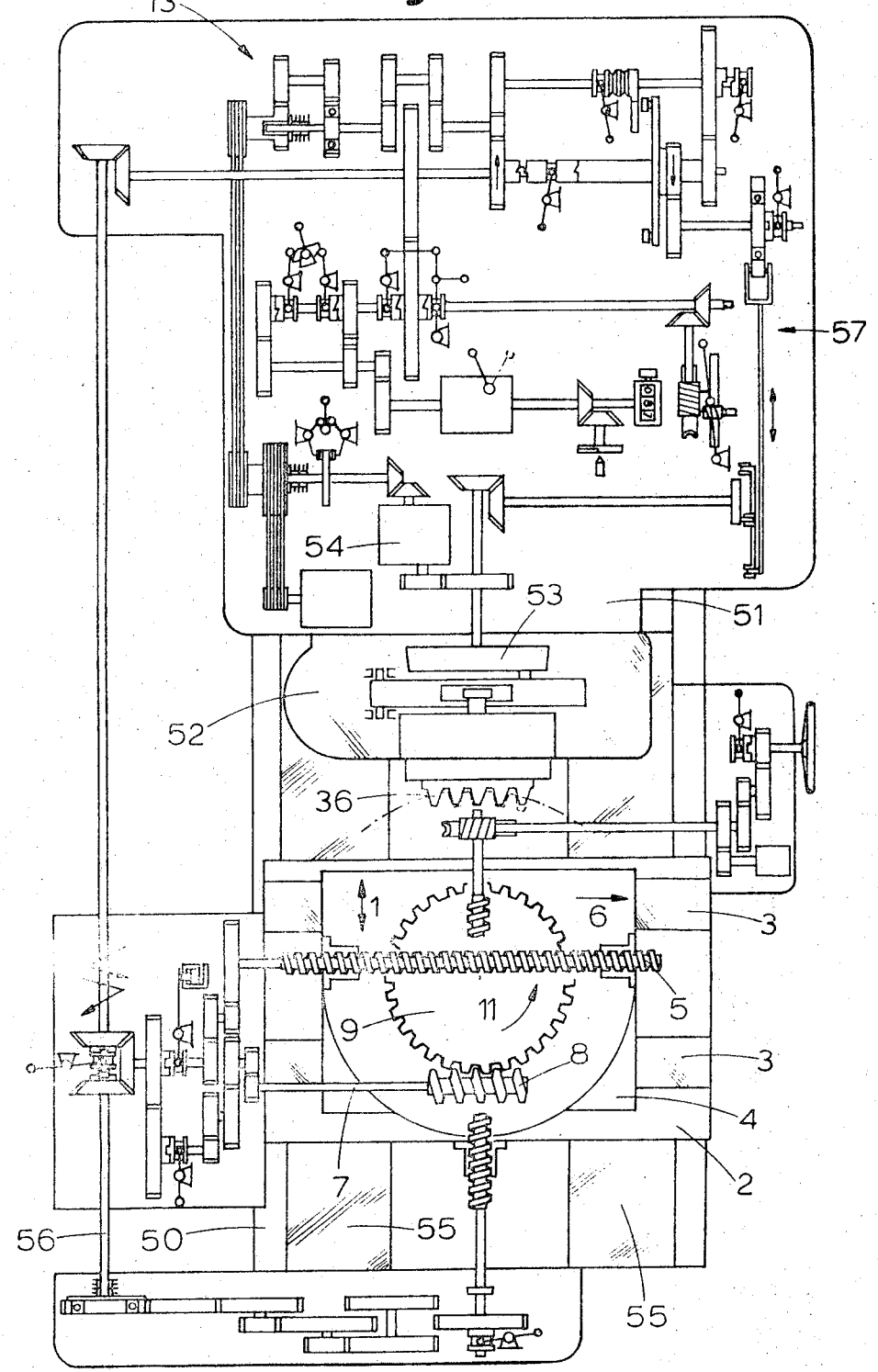
FIG. 1 illustrates some of the conventional features of a gear-cutting machine to which the invention can be applied.

Referring more particularly to FIG. 1 of the drawings, the machine comprises a base 50 having an upwardly projecting column 51 at one end on which a swivel head 52 is mounted to be disposed above the base. A rack cutter 36 on said head is reciprocable by a crank 53 driven by a motor 54. The base has guideways 55 extending towards the head and a sub-slide 2 is displaceable on the guideways towards and away from the swivel head. A top slide 4 is guided on the sub-slide by guideways 3 thereon extending perpendicularly to the guideways 55. Thus, a work table 10 (FIGS. 2 and 3) can be displaced towards and away from the rack cutter 36 in the direction of the arrow 1 and transversely of the rack cutter in the direction of the arrow 6.

A spindle 5, referred to hereinafter as the module spindle and by means of which the translatory motion of the top slide 4 on the guideways 3 can be produced in the direction of arrow 6, is supported in the sub-slide 2. The sub-slide 2 also supports a generating spindle 7 which is rotatably fixed to but axially slidable to a worm 8, supported in the top slide 4. The worm 8 meshes with a worm wheel 9 which is mounted on a work table 10 (FIGS. 2 and 3) carried by the top slide 4 and rotates the table 10 in the direction of arrow 11. The workpiece on which gear cutting is to be performed, namely a steering shaft 12, is mounted on the work table 10.

The main motor 54 drives an output shaft 56 through a transmission 13 having a clutch control means that will not be described in detail as its features are conventional and have no direct reference to the novel subject matter of the present invention.

Figure 2:
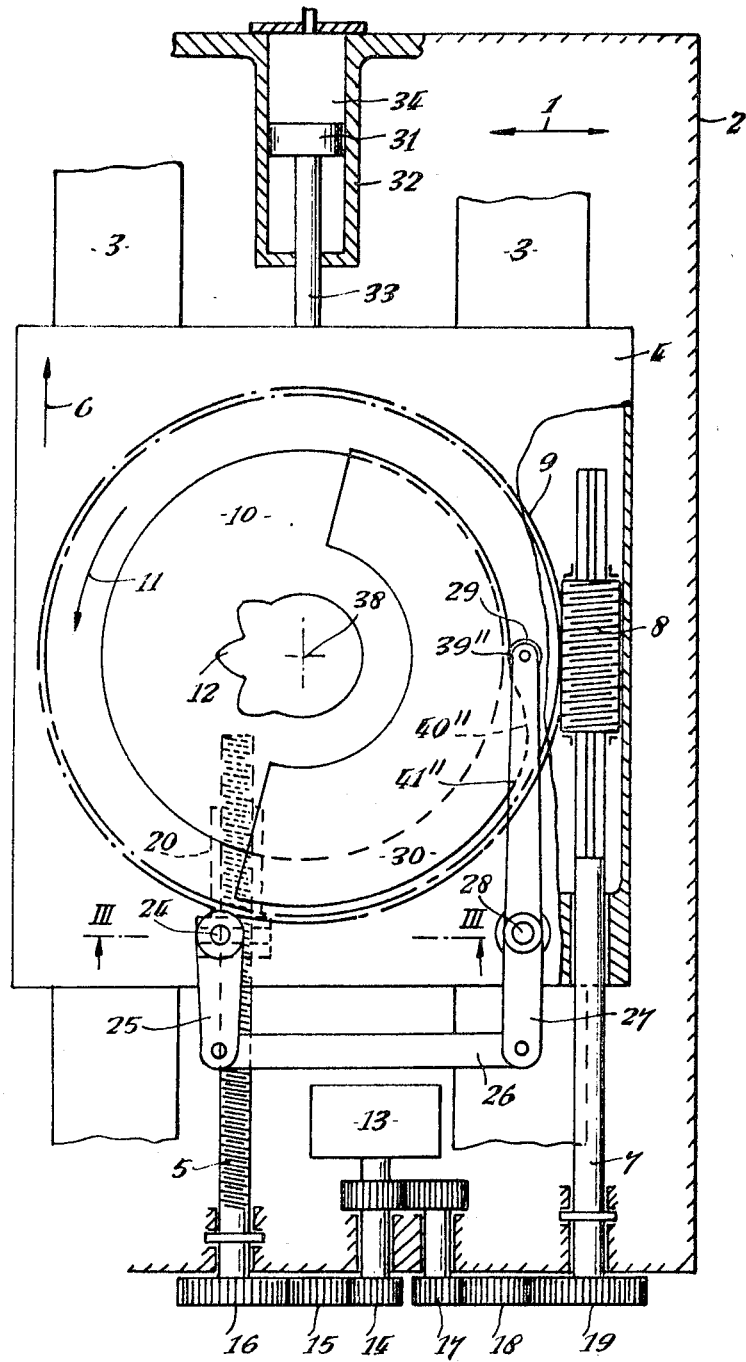
FIG. 2 is a plan view of generating apparatus according to the invention mounted on the gear cutting machine of FIG. 1.

The module spindle 5 is driven from the transmission 13 via change gearing such as the module change gears 14, 15 and 16 shown in FIG. 2 and the generating spindle 7 is driven from the same transmission via change gearing such as the part change gears 17, 18 and 19 (FIG. 2).

Figure 3:
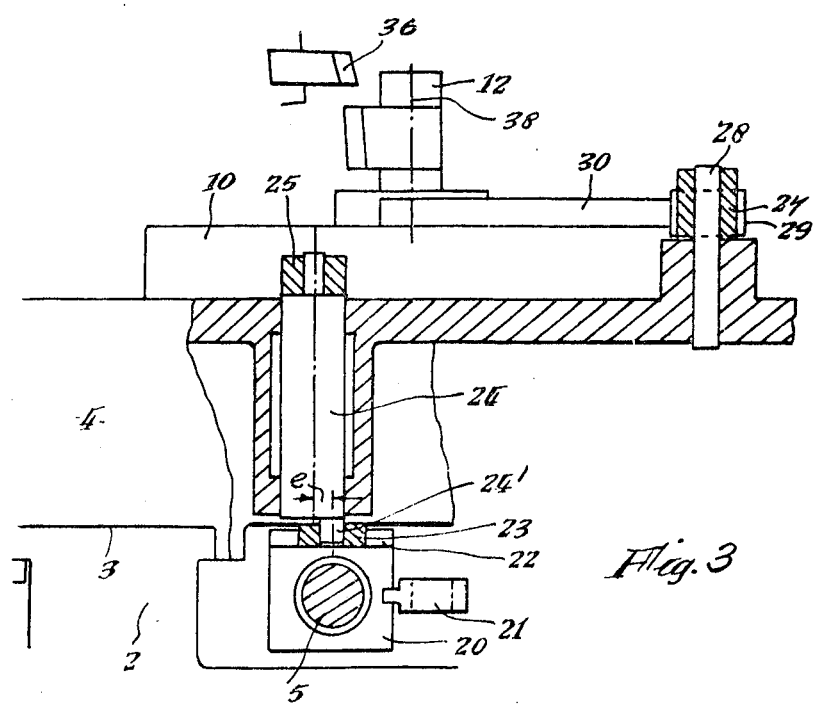
FIG. 3 is a section along the plane III—III of FIG. 2.
Figure 4:
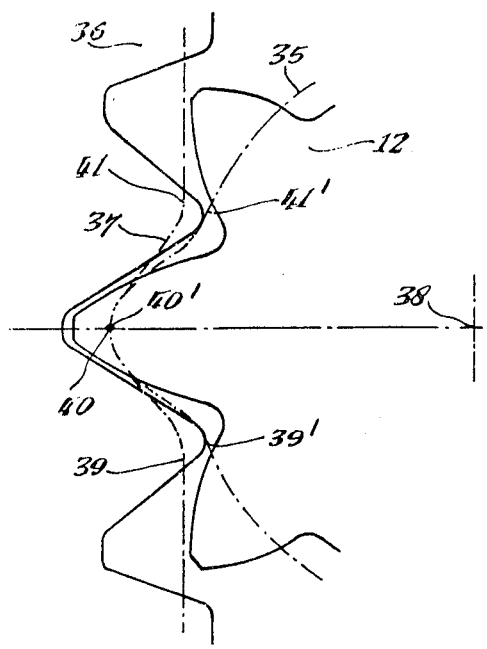
FIG. 4 illustrates a steering shaft produced by the generating apparatus and having a gear tooth system for progressive motion, together with its associated rack type cutter.

Referring now to FIGS. 2 and 3 of the drawings, a spindle nut 20 engages the module spindle 5. The nut is prevented from rotating by a key 21 and has a transverse groove 22 into which a sliding block 23 engages so as to be located relative to the spindle nut 20 in the axial direction of the module spindle 5. A pin 24' disposed on the lower end of an eccentric shaft 24, journalled in the top slide 4, and being eccentric to the shaft 24 by an amount e, engages with the sliding block 23. A lever 25, on which a rod 26 is pivoted, is secured to the upper end of the eccentric shaft 24. The opposite end of the rod 26 is pivoted to the shorter arm of a double-armed lever 27 which is supported on a fulcrum shaft 28 in the top slide 4. A roller 29, adapted to roll on a template 30 mounted on the work table 10, is supported on the longer arm of the double-armed lever 27.

A required contact force between the roller 29 and the template 30 is produced by a piston 31 in a cylinder 32 on the sub-slide 2, said piston applying a thrust to a piston rod 33 on the top slide 4 when the cylinder interior 34 is charged with pressurized oil. The said thrust acts upon the roller 29 via the eccentric shaft 24, the eccentric journal pin 24' of which bears on the spindle nut 20, the lever 25, the rod 26 and the double-armed lever 27.

The spindle nut 20 is fixedly joined to the top slide 4 when the generating motion of the apparatus is not progressive, that is to say in cutting a normal gear wheel having a generating circle of a defined diameter. The transmission 13 will then drive the module spindle 5 via the module change gears 14, 15 and 16 to displace the top slide in the direction of the arrow 6 and will, at the same time, also drive the generating spindle 7 and therefore the worm 8 via the part change gears 17, 18 and 19, the worm by co-operating with the worm wheel 9 in turn rotating the work table 10 in the direction indicated by the arrow 11. The two motions 6 and 11 produce the generating motion of the workpiece which is to undergo gear cutting with a defined generating circle which rolls without slip along the straight reference line of a rack cutter 36 operating in a conventional manner, as though the rack cutter and workpiece were functioning as a rack and pinion transmission.

Adjustment of the rate of reciprocation of the rack cutter is effected by a regulating mechanism 57 so that the number of cutting strokes per tooth pitch can be varied. It will be apparent that the rack cutter motion is not otherwise co-ordinated with the generating motion since it is independent of the transmission ratios set by the change gears 14 to 19 in the drives displacing the work table.

While performing the generating motion along the straight reference line of the rack cutter corresponds to the mode of operation for a normal gear cutting process by the generating method, if it is desired to provide on a workpiece, for example the steering shaft 12, a gear tooth system which has a generating curve 35 instead of a generating arc or circle, the rack cutter 36 then having a reference curve 37 instead of a straight reference line, it will be necessary for the generating curve 35 to roll on the reference curve 37, also without slip, while the steering shaft 12 together with the work table 10 rotates about its axis 38 and the rack type cutter 36 performs its reciprocating cutting motion. The rack type cutter 36 corresponds substantially to the steering rack which will subsequently mesh with the steering shaft 12.

During the generating motion of the workpiece 12, said motion comprising the rotating motion in the direction of the arrow 11 and the translatory motion in the direction of the arrow 6, the greatest generating transmission ratio will occur when points 40 and 40' of the reference curves 37 and 35 coincide; by contrast, the smallest generating transmission ratio occurs in motions from the limit positions at which the points 39 and 39' or 41 and 41' coincide.

In the illustrated apparatus, the beginning of the changed generating transmission ratio, i.e., the first limit position, corresponds to the roller 29 reaching the point 39'' on the template 30. Further rotation in the direction of the arrow 11 causes the roller 29 to be thrust radially outwardly by the template 30. This motion is transmitted via the double-armed lever 27 and the rod 26 to the lever 25; accordingly, the eccentric shaft 24 rotates and, because of the engagement of the eccentric journal pin 24' in the transverse groove 22 of the sliding block 23, imparts an additional translatory motion to the top slide 4 in the direction of the arrow 6, such motion affection the generating transmission ratio.

The maximum supplementary motion is obtained when the roller 29 is at the point 40'' of the template 30; this point corresponds to the point 40 on the reference curve 37 of the tool and the point 40' on the generating curve 35 of the gear tooth system which is to be cut on the steering shaft 12. As the generating motion is continued further, the supplementary motion of the top slide 4 is reduced to come to a stop when the roller 29 reaches the point 41'' of the template; no further supplementary motion of the top slide takes place from this point which corresponds to point 41 on the reference curve 37 of the tool and point 41' on the generating curve 35 at which position the original generating transmission ratio exists between the workpiece and tool as at the beginning of the generating motion. The gear tooth system of the steering shaft is thus finish machined.

In reversing the direction of rotation of the transmission 13, a corresponding generating motion will take place in the reverse direction until the starting position is once again obtained, in which the steering shaft, having been provided with its finished gear tooth system, is replaced by a further shaft to be machined.

The thrust of the piston 31 acting on the top slide against the direction of the arrow 6 ensures that all co-operating parts of the generating apparatus bear upon each other completely without slack. If the template 30 has particularly small radii of curvature between the points 39'' and 41'' it will be appropriate for the roller 29 to be replaced by a stylus pin, for example constructed of hard metal.

Since steering shafts without flank backlash must be adjusted to the associated rack, the gear tooth system thereof is constructed as a so-called beveloid gear tooth system, that is to say the pinion is cut, as illustrated in FIG. 2, as a bevel spurgear. It will be appreciated, however, that the invention is not limited to the manufacture of such beveloid gearing.

What we claim and desire to secure by Letters Patent is:

1. In a gear cutting machine having a table for carrying a workpiece and tool mounting means, means producing relative generating motion between a tool on said mounting means and said workpiece that is modified from normal generating motion in order to generate on said workpiece a plurality of teeth, adapted for a varying ratio gear tooth system comprising, in combination, a carrier on which the workpiece table is rotatably mounted for rotational displacement of the workpiece, slide means on which the carrier is mounted for linear displacement of the table and workpiece, drive means for said rotational and linear displacements to produce a normal generating motion between the tool and the workpiece, cam means secured relative to the table for rotation therewith, follower assembly means engaging said cam means and connected to said carrier to provide a supplementary relative linear displacement between the table and the tool in accordance with the profile of the cam means such as to produce an additional generating motion between the tool and the workpiece modifying the normal generating motion whereby to produce a generating curve adapted for said varying ratio system.

2. A gear cutting machine according to claim 1 wherein said drive means compromises a drive input, a spindle connected to said input to be rotated thereby, a nut element engaging said spindle to be displaceable therealong upon rotation of the spindle, said nut element being connected to the carrier whereby operation of the drive input produces linear displacement of the workpiece for said normal generating motion, means permitting relative displacement between the tool and the workpiece in said linear motion direction of the nut element relative to the carrier, said cam means being arranged to control said relative displacement and thus to impart said additional generating motion to the workpiece.

3. A gear cutting machine according to claim 2 wherein said follower assembly means comprises a lever having a pivot axis on the carrier and an adjustment element connected to said lever at a position eccentric to said pivot axis on the carrier, a receiving recess in said nut element directed transversely to said linear displacement direction, said adjustment element being engaged by said recess whereby displacement of the adjustment element by pivoting of the lever produces linear movement of the carrier relative to said nut element in the direction of linear displacement.

4. A gear cutting machine according to claim 2 wherein bias means apply a force to the carrier against the direction of carrier movement to provide a resistance of substantially constant force acting against the displacement of the carrier as the workpiece is being cut.

5. A gear cutting machine according to claim 4 wherein said bias means comprise a piston and cylinder unit, a base or sub-frame portion of the machine providing a support for the reaction force developed by said unit.

* * * * *